UNITED STATES PATENT OFFICE.

CHARLES GLASER, OF BALTIMORE, MARYLAND.

PROCESS OF MAKING ACID PHOSPHATE.

SPECIFICATION forming part of Letters Patent No. 417,820, dated December 24, 1889.

Application filed November 8, 1888. Serial No. 290,309. (No specimens.)

*To all whom it may concern:*

Be it known that I, CHARLES GLASER, a native of Germany, residing at Baltimore, Maryland, United States of America, have invented new and useful Improvements in the Process of Making Acid Phosphate, of which the following is a specification.

My invention relates to a certain new and useful improvement in the method of converting insoluble phosphoric acid contained in mineral or petrified phosphates into available phosphoric acid by the direct application of phosphoric acid. This generic idea formed the subject-matter of Letters Patent granted to me September 18, 1888, No. 389,566, in which I have described a process by which it is practicable to produce out of mineral or petrified phosphates, by the direct application of the necessary amount of concentrated phosphoric acid, a high-grade acid phosphate of lime, the main characteristic being a comparatively large amount of monocalcic phosphate soluble in water.

My present invention involves the process in the nature of an improvement upon that described in the patent referred to, such improvement being based on the following fact, which I have discovered. If a finely-divided mineral or petrified phosphate is digested with an amount of phosphoric acid, in a diluted state, insufficient to convert all of the tricalcic phosphate or corresponding compound contained therein into monocalcic phosphate or corresponding compound, but exceeding the theoretical amount necessary to convert the same into bicalcic phosphate or corresponding compound, the tricalcic phosphate or equivalent can be converted into a mixture of monocalcic and biorcalcic phosphates or equivalents, available as plant-food, although not entirely soluble in water; thus, although of a high grade of availability, differing distinctly from the product of the process described in the patent referred to in the latter degree. A considerable saving in the amount of phosphoric acid used in the conversion is thus effected, which may amount to about twenty-five per cent. when compared with my former process.

My present new and improved process is to treat or digest finely-divided mineral or petrified phosphate with an amount of diluted phosphoric acid theoretically insufficient to convert all of the tricalcic phosphate or corresponding compounds therein contained into monocalcic phosphate or corresponding compounds, but exceeding the theoretical amount necessary to convert the same into bicalcic phosphate or corresponding compound, thus converting the tricalcic phosphate or equivalent into a mixture of monocalcic and bicalcic phosphates or equivalents available as plant-food, though not entirely soluble in water; and to then evaporate the unnecessary moisture from the mixture, the result being a new, useful, and convenient form of plant-food of a high grade of availability as respects phosphoric acid.

In carrying out my present method of treatment the following has given the best results: I place the amount of phosphoric acid, previously ascertained, in a suitable vessel, dilute, if necessary, with enough water to keep the mass in a liquid state during the digestion, and apply the finely-divided mineral or petrified phosphate in small quantities, waiting between each charge until the same has become thoroughly mixed with the liquid, which is accomplished by agitating the latter. After all the finely-divided phosphate has thus been thoroughly mixed with the liquid I apply sufficient heat by steam or otherwise, and I finally evaporate the liquid under constant stirring or agitation. If all the phosphate is placed suddenly or at one time into the dilute acid, or if the latter is poured onto the phosphate, the same result will be obtained, but in a less desirable degree, and I therefore prefer the treatment above set forth.

What I claim as new, and desire to secure by Letters Patent, is—

The method hereinbefore described of converting the insoluble phosphoric acid contained in mineral and petrified phosphates into available phosphoric acid by first finely dividing the mineral or petrifaction, then exposing it to the action of dilute phosphoric acid, and subsequently evaporating from the mixture the moisture contained therein by the action of heat, substantially as herein described.

In testimony whereof I have hereunto set my hand in the presence of two subscribing witnesses.

CHARLES GLASER.

Witnesses:
W. P. HOMANS,
L. K. SPARROW.